Patented Mar. 25, 1941

2,235,843

UNITED STATES PATENT OFFICE 2,235,843

PROCESS FOR DESTROYING BACTERIA

Richard Müller, Berlin, Germany

No Drawing. Application July 19, 1938, Serial No. 220,138. In Germany October 16, 1936

2 Claims. (Cl. 167—14)

The bactericidal action of silver ions in solution is known.

Now, this invention has for its object the use of silver or silver compounds in a vaporized condition; for, it has been found that silver even in this state proves a strong bactericide effect.

Another object of this invention resides in suitable methods of preparing gaseous disinfecting means, more particularly air containing silver or silver compounds. These and other objects will more clearly read from the following specification.

If, for example, air or any other gas be passed in known manner over highly heated silver, and if the gas charged in this way by silver vapour enters into a room containing well growing cultures of hyphomy-cetes, yeasts, bacteria and microbes, these cultures will show already after some hours a restrained growth while under a permanent influence of the silvered gas, the surface cultures on solid culture-media will be killed and liquid media will be disinfected thoroughly.

Furthermore, it has been found that if the silvered gas leaving the tube be washed by distilled water, even the latter, owing to the fine distribution of the silver will show an increased bactericidal, that is, sterilizing action; porous or finely divided bodies like kieselguhr, adsorptive coal, cotton or the like, may obtain in the same way sterilizing properties and become at the same time sterile.

Thus, the said air containing silver vapours may be used for the disinfection of rooms, for example of hospitals, operating rooms, assembly-rooms, as well as for the preservation and storage of easily perishable matters such as victuals.

It has, furthermore, been discovered that air or gases containing silver vapours may also be produced by heating silver compounds in a stream of air vapour or gas. For this purpose, e. g. ceramic porous materials, such as Raschig rings or similar elements offering a large surface and enabling at the same time a favorable air circulation, may be impregnated by silver nitrate, for instance, and then be put in a porcelain tube, which is externally heated by electricity or gas.

Instead of silver nitrate also other silver compounds may be used which in a heated condition and when air is passed over them, will produce silver-containing air or gases.

A still further embodiment of this invention resides in electrically heating resistance-wires not alloyable with silver, and thus also heating silver or silver compounds of alloys respectively, arranged on the surface of such wires; it is also possible to coat such heating wires or rods with a thin insulating layer before applying the silver-containing substance. The heating material can also, like in case of the so-called Nernst-lamp, be an electric conductor of third class which is only by supplemental heating enabled to conduct electric current. The electric current may be applied as an arc or as sparks for evaporating the silver, if the + pole consists of silver or a compound or alloy thereof or even of a heating member, say a carbon, containing such metal.

It would also be possible to circulate silver in a highly heated or in fused condition through the gases to be treated; so, for example, a continuous silver band could be moved against the gas stream, or fused silver can be made fall in drops against this stream. The air can also be passed over heated, fused or finely divided silver together with the heating gas like, for instance, hydrogen and air are handled in case of Drummond's light.

In the manner described, as already mentioned, also silver compounds can be spread in a fine state through rooms, liquids or upon solid bodies by evaporating said compounds in a similar way or by converting evaporated silver in its vapour form or even upon condensation.

Instead of silver, silver alloys may be used, too.

What I claim is:

1. A process for destroying bacteria comprising vaporizing a silver compound in a gaseous medium, whereby said gaseous medium contains finely divided silver and treating the bacteria therewith.

2. A process for destroying bacteria comprising vaporizing a silver compound in air whereby said air contains finely divided silver and treating the bacteria therewith.

RICHARD MÜLLER.